United States Patent [19]

Cuff

[11] 3,998,107
[45] Dec. 21, 1976

[54] DEVICE FOR CONVERTING ROTARY MOTION INTO A UNIDIRECTIONAL LINEAR MOTION

[76] Inventor: Calvin I. Cuff, 135 Ocean Ave., Brooklyn, N.Y. 11225

[22] Filed: Oct. 29, 1974

[21] Appl. No.: 518,702

[52] U.S. Cl. .............................................. 74/84 S
[51] Int. Cl.² ...................................... F16H 27/04
[58] Field of Search ................................... 74/84 S

[56] References Cited
UNITED STATES PATENTS 1,953,964   4/1934   Laskowitz ......................... 74/84 S

*Primary Examiner*—Samuel Scott
*Assistant Examiner*—Wesley S. Ratliff, Jr.

[57] ABSTRACT

This invention relates to new and useful improvements in devices that convert rotary motion into unidirectional motion by varying the radius of gyration of a plurality of gyrating masses which gyrate in a plane that is perpendicular to the axis of rotation. An improved mechanism, comprised of a normally stationary cranklike shaft, is disclosed for changing the direction of the resultant force and for continuously varying the radius of gyration of the gyrating masses. Also an improved means of support for the gyrating masses is disclosed which permits the use of linear motion bearings in order to substantially reduce the friction and wear of the slidable gyrating masses and their associated supporting structure.

2 Claims, 3 Drawing Figures

FIG. 3

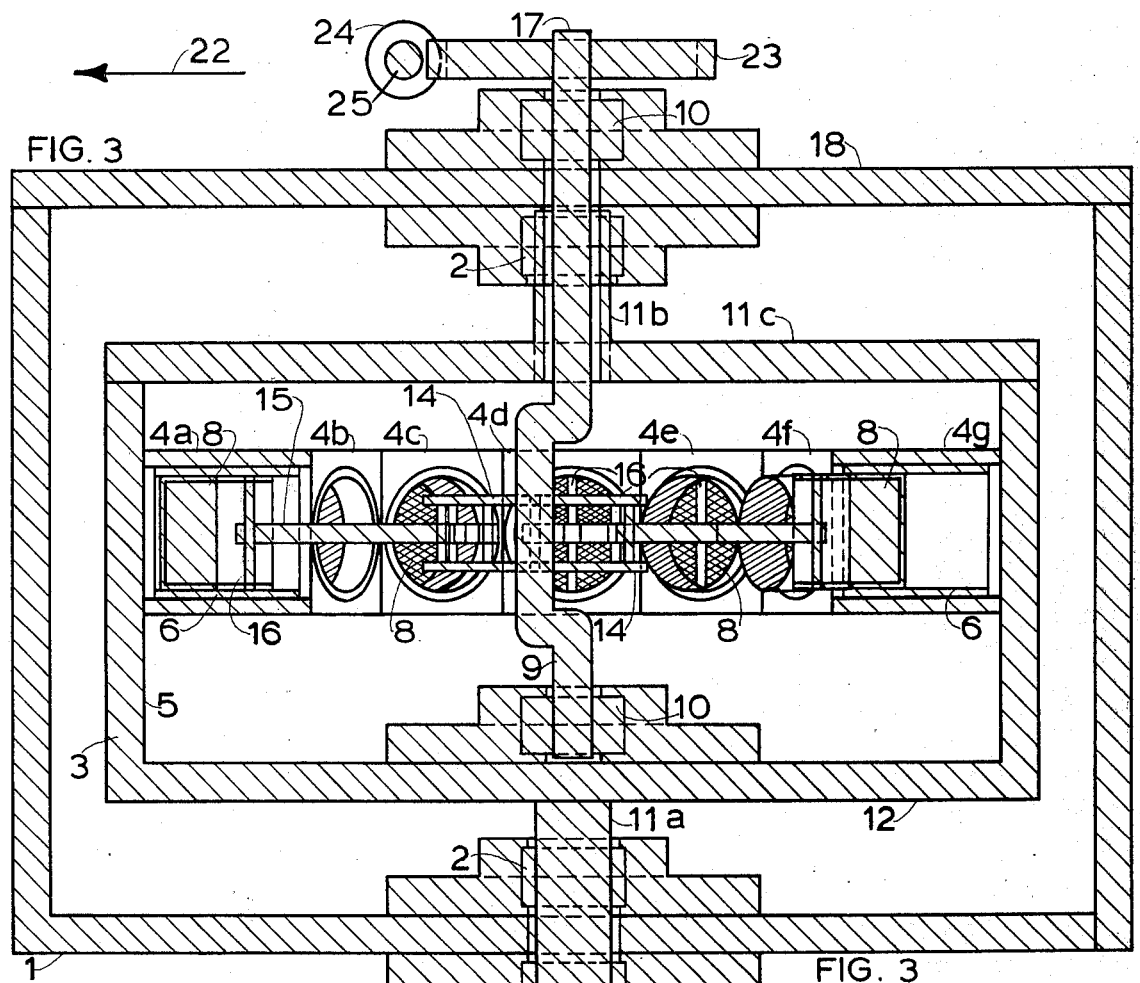
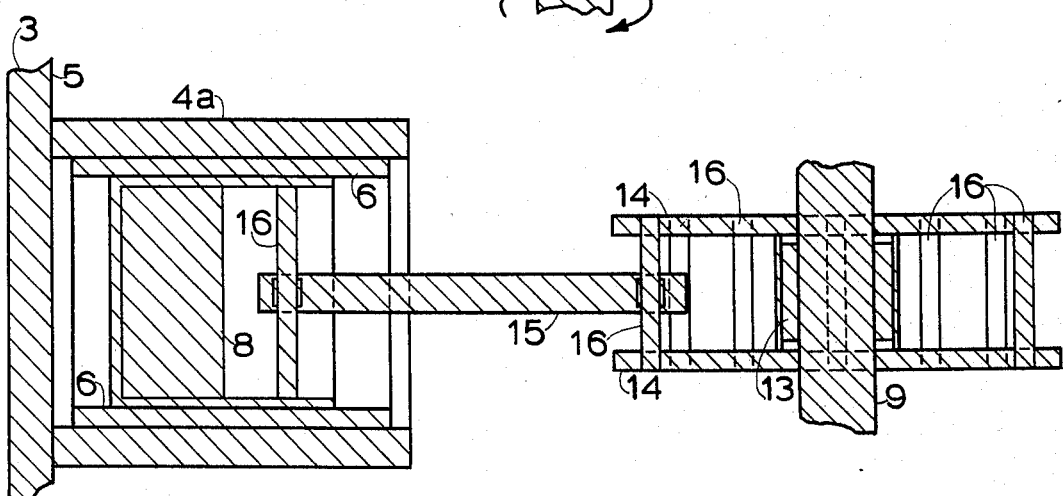

DEVICE FOR CONVERTING ROTARY MOTION INTO A UNIDIRECTIONAL LINEAR MOTION

CROSS-REFERENCE TO PRIOR APPLICATIONS

Cross-reference to Prior Applications

| Serial No. | Filing Date |
|---|---|
| 486,700 | July 8, 1974 |
| 493,748 | Aug. 1, 1974 |

BACKGROUND OF THE INVENTION

1. Field of the Invention

This invention, in general, is related to a class of devices which utilize the centrifugal forces produced by a plurality of gyrating masses to produce a single resultant unbalanced centrifugal force which acts in one direction.

2. Description of the Prior Art

With the exception of rocket engines, jet engines, and the class of propulsive systems of which the present invention is a member, all other propulsive systems, although they also utilize the principle or law of action-and-reaction, are dependent upon a reactive medium or component that is external to the device or system that is producing the active force of the action-reaction system in order to achieve propulsion.

In the field of rotary-motion-into-unidirectional-motion converters, the prior art has provided several systems which, for one reason or another, suffer many disadvantages making them not acceptable for general usage, such as being overly complex to manufacture, require complex driving systems and critically interrelated rotating components, and the like.

SUMMARY OF THE INVENTION

The present invention produces an unbalanced centrifugal force by utilizing a normally stationary crank-like shaft to radially position the gyrating masses as they gyrate about a common axis of rotation along with their common, rotating, supporting structure.

The path of rotation of the gyrating masses contains certain predetermined positions, 180° apart and which are determined by the crank-like shaft, at which each of the gyrating masses alternately attain their maximum and minimum radial distances. The gyrating masses are spaced at equal angular intervals and are driven in such a manner that when one gyrating mass is at the position of the maximum-radial-distance predetermined position, then another gyrating mass is at the position of the minimum-radial-distance predetermined position. Since the centrifugal force produced by a gyrating mass is proportional to the radius of gyration, this results in the production of an unbalanced centrifugal force which acts in the direction of the maximum-radial-distance predetermined position which is made to correspond to the desired direction of travel by means of the crank-like shaft.

The present invention has a provision for rotating the normally stationary crank-like shaft and thus changing the directional position of the maximum and minimum-radial-distance predetermined positions, and thus changing the direction of the resultant centrifugal force.

BRIEF DESCRIPTION OF THE DRAWINGS

In the accompanying drawings forming a part of this specification, and in which like reference characters are employed to designate like parts throughout same:

FIG. 2 is an enlarged, partial, cross-sectional view along line A—A of FIG. 1;

FIG. 3 is a vertical cross-sectional view of the present invention along line A—A of FIG. 1.

DESCRIPTION OF THE PREFERRED EMBODIMENTS

Figure 1:
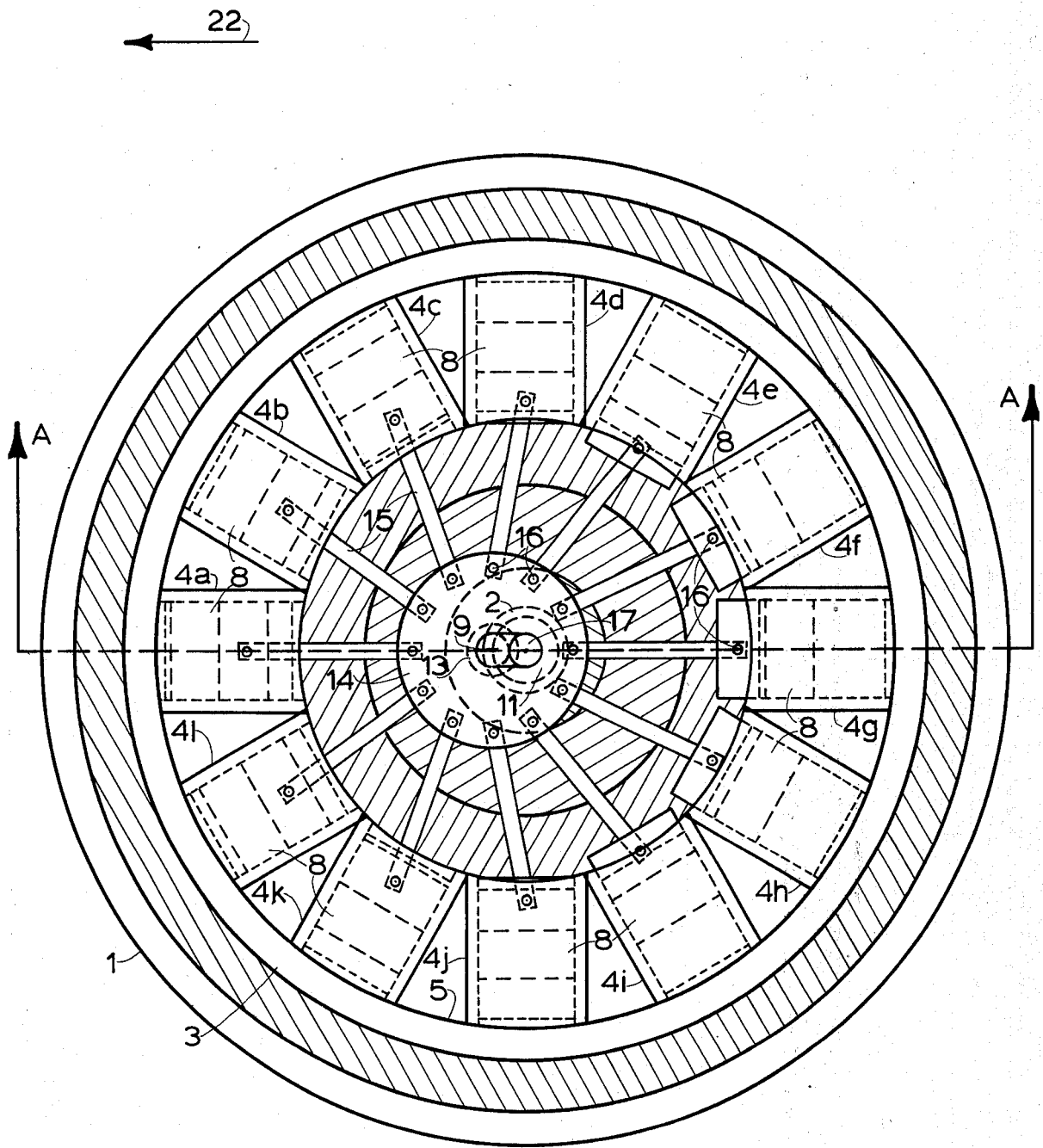
FIG. 1 is a schematic top plan view of the present invention. A top cover plate is removed in the illustration.

Referring now to the drawings in detail and in particular to FIGS. 1 and 3, there is illustrated a preferred form of a device for the conversion of rotary motion into a unidirectional linear motion. The device constructed in accordance with the principles of the present invention is comprised of a housing 1 which is mounted in some vehicle or some other movable structure (not shown). Journaled in bearings 2 for rotation within sealed housing 1 is a cylindrical supporting structure 3 which has twelve cylindrical chambers 4a – 4l attached to its inner surface 5 with their longitudinal axis perpendicular to the axis of rotation and spaced at equal angular intervals. A linear motion ball bearing 6 is mounted inside of each cylindrical chamber 4a – 4l. Mounted for sliding radial movement inside of each linear motion ball bearing 6 is a mass 8 inside of the piston head. A normally stationary crank-like shaft 9, journaled for rotation in bearings 10, is mounted coaxially with the axis of rotation of the rotating, cylindrical, supporting structure 3, with the axis of the drive shaft 11a and with the drive shaft extension 11b, of drive shaft 11a, which is attached to cover plate 11c. Drive shaft 11a is attached to the bottom surface 12 of supporting structure 3 and passes through the sealed housing 1 by way of bearings 2. Mounted with bearing 13 (best illustrated in FIG. 2) on the displaced crank segment of crank-like shaft 9 is a coupling device 14 which connects each gyrating mass 8 to the crank-like shaft 9 by means of connecting rods 15 and wrist pins 16. End 17 of crank-like shaft 9 passes through cover plates 11c and 18 (shown in FIG. 3) by way of bearing 10. Clutch 21 allows the drive motor (not shown) to be disconnected from the drive shaft 11a. The approximate direction of travel is indicated by arrow 22. End 17 of crank-like shaft 9 has circular gear 23 mounted on it. Worm gear 24 is attached to shaft 25 and meshes with circular gear 23.

In operation, the rotation of drive shaft 11a results in the rotation of the gyrating mass support structure 3 and the gyrating masses 8. Since the axis of the displaced crank segment of the normally stationary crank-like shaft 9 doesn't coincide with the axis of rotation of the gyrating masses 8, the radial distance of each gyrating mass 8 varies from some minimum distance to some maximum distance; this resulting in a variation of the centrifugal force produced by each gyrating mass 8. Thus the angular position or direction of the crank segment of the normally stationary crank-like shaft 9 predetermines the positions where the gyrating masses attain their maximum and minimum radial distances and thus where the gyrating piston-masses produce their maximum and minimum centrifugal forces respectively. The maximum- and minimum-radial-distance predetermined positions are spaced 180° apart and since the gyrating masses are arranged such that one gyrating mass is at the position of the maximum-radial-distance predetermined position when some other gyrating mass is at the position of the minimum-radial-distance predetermined position, this results in a net imbalance of centrifugal force between that produced by the gyrating masses at the maximum- and minimum-radial-distance predetermined positions. Similarly, a net imbalance of centrifugal force is also produced by those gyrating masses which are approaching and leaving the maximum-radial-distance predetermined position and those gyrating masses which are approaching and leaving the minimum-radial-distance predetermined position. The result is a net imbalance in centrifugal force which acts in the direction of the maximum-radial-distance predetermined position and which represents the sum of all the components of the forces acting in this direction less the sum of all the components of the forces acting in the opposite direction.

Due to the fact that the linear velocity of each gyrating mass is continuously changing, there is thus a linear acceleration associated with each gyrating mass. The effect of the linear acceleration is to produce centrifugal force components which act at right angles to those centrifugal force components which are produced by the radial acceleration. In the present embodiment of the invention described in this specification, the sum of the tangential force components of all the gyrating masses produces a substantially constant unbalanced force which acts in a direction that is perpendicular to an axis which passes through the maximum- and minimum-radial-distance predetermined positions. Thus the final resultant propulsive force is the vectoral sum of the resultant tangential force and the resultant radial force and will act in a direction at some angle to the axis which passes through the maximum- and minimum-radial-distance predetermined positions.

The angular position or direction of the displaced crank segment of crank-like shaft 9 determines the positions where the gyrating masses attain their maximum- and minimum-radial-distance and thus the direction of the resultant unbalanced force. The direction of the resultant unbalanced force can be changed by rotating shaft 25 which causes the worm gear 24 to rotate circular gear 23 which is mounted on the crankshaft 9.

Having thus described the invention, what is claimed is:

1. In a device that converts rotary motion into unidirectional motion by varying the radius of gyration of a plurality of gyrating masses which device includes means for both supporting said plurality of gyrating masses and permitting sliding radial movement of said plurality of gyrating masses, and means for changing the direction of the resultant unbalanced force produced by the rotation of said plurality of gyrating masses in a plane which is perpendicular to the axis of rotation, the improvement comprising:

an axis of rotation;
a crank-like shaft mounted coaxially with respect to said axis of rotation and perpendicularly with respect to said plane which contains said plurality of gyrating masses, said crank-like shaft having a single throw or crank, and said crank-like shaft being normally non-rotating relative to the housing or vehicle that contains said device that converts rotary motion into unidirectional motion; and
each of said plurality of gyrating masses being connected to said crank-like shaft by means which includes a connecting rod.

2. The device as set forth in claim 1 in which said crank-like shaft is rotatably mounted with respect to said means for supporting said plurality of gyrating masses, and including means for rotating the position of said throw or crank with respect to the axis of said crank-like shaft to selectively change the direction of the resultant unbalanced force produced by the rotation of said plurality of gyrating masses.

* * * * *